(12) United States Patent
Locko et al.

(10) Patent No.: US 7,750,105 B2
(45) Date of Patent: Jul. 6, 2010

(54) RESINS AND ADHESIVE FORMULATIONS THEREWITH

(75) Inventors: George A Locko, Savannah, GA (US); Abhay K Deshpande, Savannah, GA (US)

(73) Assignee: Arizona Chemical Company, Jacksonville, FL (US)

( * ) Notice: Subject to any disclaimer, the term of this patent is extended or adjusted under 35 U.S.C. 154(b) by 191 days.

(21) Appl. No.: 11/443,792

(22) Filed: May 31, 2006

(65) Prior Publication Data

US 2006/0217511 A1 Sep. 28, 2006

Related U.S. Application Data

(62) Division of application No. 10/655,162, filed on Sep. 4, 2003, now abandoned.

(51) Int. Cl.
*C08L 93/04* (2006.01)
*C09F 1/04* (2006.01)

(52) U.S. Cl. .......................... 527/503; 528/86; 530/210; 530/215

(58) Field of Classification Search ................. 530/215, 530/210; 528/86; 527/503
See application file for complete search history.

(56) References Cited

U.S. PATENT DOCUMENTS

| | | | | |
|---|---|---|---|---|
| 2,284,156 | A | * | 5/1942 | Lemmer et al. ............. 530/215 |
| 3,617,591 | A | | 11/1971 | Tenner |
| RE29,157 | E | | 3/1977 | Petersen et al. |
| 4,048,378 | A | | 9/1977 | Pelzek |
| 4,500,661 | A | | 2/1985 | Lakshmanan |
| 4,990,339 | A | | 2/1991 | Scholl et al. |
| 5,723,566 | A | | 3/1998 | Salvetat et al. |
| 5,733,958 | A | | 3/1998 | Adams et al. |
| 5,844,063 | A | | 12/1998 | Salvetat et al. |
| 5,897,412 | A | | 4/1999 | Shapiro |
| 5,977,222 | A | | 11/1999 | Wakayama et al. |
| 6,022,947 | A | | 2/2000 | Frihart et al. |
| 6,054,606 | A | | 4/2000 | Irie et al. |

FOREIGN PATENT DOCUMENTS

| | | | |
|---|---|---|---|
| GB | 644291 | | 10/1950 |
| GB | 663823 | | 12/1951 |
| GB | 788687 | | 1/1958 |
| GB | 1052860 | | 12/1966 |
| GB | 1058074 | | 2/1967 |
| GB | 1095960 | | 12/1967 |
| JP | 1-275677 | * | 11/1989 |
| JP | 1-275677 A | | 11/1989 |
| JP | 1-292077 | * | 11/1989 |
| JP | 1-292077 A | | 11/1989 |
| JP | 7-82541 | | 3/1995 |
| JP | 7-82541 | * | 5/1995 |

OTHER PUBLICATIONS

Hawley's Condenced Chemical Dictionart, eleventh edition, p. 1015.*
Patent Abstract of Japan, JP 56-100879, Aug. 13, 1981.
Patent Abstract of Japan, JP 01-278589, Nov. 8, 1989.
Sax, et al., Hawley's Condensed Chemical Dictionary, Eleventh Edition, p. 1015, 1987.
Arizona Chemical Brochure, 2008 The Cary Company.
Sylvares TP 7042 Resin Product Data Sheet, Feb. 2004 Arizona Chemical.
Sylvares TR 1085 Resin Product Data Sheet, Feb. 2004 Arizona Chemical.

* cited by examiner

*Primary Examiner*—Irina S Zemel
(74) *Attorney, Agent, or Firm*—Gilbreth Roebuck, P.C.; J. M. (Mark) Gilbreth; Mary A. Gilbreth

(57) ABSTRACT

A process for producing rosin resins comprising reacting together rosin and phenolic compound and/or terpene-phenol resin, in the presence of a Brønsted acid. These resins may be used as tackifiers in adhesive formulations, including chloroprene contact cements.

19 Claims, No Drawings

RESINS AND ADHESIVE FORMULATIONS THEREWITH

This application claims priority to and is a Divisional Application of U.S. application Ser. No. 10/655,162, filed Sep. 4, 2003, now abandoned, which is hereby incorporated, in its entirety, herein by reference.

BACKGROUND OF THE INVENTION

1. Field of the Invention
2. Description of the Related Art

A tackifier resin is a material that enhances the adhesive properties of an adhesive formulation, where another major component of the formulation is a base polymer, e.g., a rubber. The use of rosin and rosin derivatives to form tackifier resins is well known in the art (see, e.g., Kennedy et al., "Rosin in Adhesive Tackifiers," Naval Stores (Zinkel and Russell, Eds.), Chapter 18, Pulp Chemicals Association (1989)). Rosin-based tackifier resins make a significant contribution to the performance properties of an adhesive formulation, for example, the tackiness, peel-resistance and ease of surface wetting of the formulation are impacted by the selection of the tackifier.

One type of adhesive composition is known as contact cement or contact adhesive. Contact cements are a type of adhesive product used to bond two substrates together. In a typical use of contact cement, two substrates to be bonded together are each coated with the cement, and the cement is allowed to dry briefly before proceeding. The substrates are then brought together so that the cement domain on one substrate establishes contact with the cement domain on the other substrate. The adhesivity of the cement is sufficiently strong so that once contact between cement domains is established, only a small amount of pressure (e.g., the amount of pressure put forth by normal human physical strength) is needed to forge a strong adhesive bond. This bond is typically instantaneous, and additional pressure (such as by clamping the substrates together) is normally not needed to maintain the bond.

Contact cements often contain tackifier and a polymer such as chloroprene polymer or thermoplastic rubber. Cements formulated using thermoplastic rubber may be solvent-based, while cements formulated using chloroprene polymer may be solvent-based or latex-based. Contact cements are frequently used as, for example, automotive adhesives, construction adhesives, and laminating adhesives.

The following patents are directed to the use of rosin-derived resins in adhesive compositions, including contact cements:

U.S. Pat. No. 5,977,222 (1999), assigned to Tosoh Corporation, is directed to chloroprene-containing adhesive compositions. The tackifier used in the adhesive compositions may include rosin and rosin derivatives.

U.S. Patent No. Re. 29.157 (1977) and U.S. Pat. No. 3,617,591 (1971), both assigned to Schenectady Chemicals, Inc., are directed to adhesive compositions comprising chloroprene and the heat reaction product of zinc resinate and an alkaline-condensed alkyl- or aryl-substituted phenol formaldehyde resin. Rosin is disclosed as an optional component of the adhesive compositions.

British Patent Specification 663,823 (1951), assigned to Minnesota Mining and Manufacturing Company, is directed to butadiene-styrene copolymer adhesive compositions for pressure-sensitive adhesive tapes, where these tapes may include rosin or terpene.

There is a need in the art for improved tackifier resins, particularly for contact cement adhesive compositions. The present invention fulfills this need and provides other related advantages as described below.

BRIEF SUMMARY OF THE INVENTION

Briefly, in one aspect, the present invention provides a process for producing a resin comprising reacting together rosin and at least one of a phenolic compound and a terpene-phenol resin, in the presence of a Brønsted acid. In an optional aspect the rosin is gum rosin, while in a separate optional aspect the Brønsted acid is a sulfonic acid or a sulfuric acid. The present invention also provides a resin produced by this process. The resin produced by this process may be characterized by, for example, one or more of: a softening point of 115-150° C., an acid number of 10-85, a Mw of 550-1400, a Mn of 405-750, and a neat Gardner color of 6-12.

In one aspect of the present invention, the process for producing a resin comprises reacting together rosin and terpene-phenol resin, where in preferred aspects the terpene-phenol resin has a softening point of about 125-150° C. and/or the rosin and terpene-phenol are reacted together in a rosin:terpene-phenol weight ratio of about 40:60 to about 60:40. Exemplary terpenes used to prepare the terpene-phenol resin include, without limitation, d-limonene, dipentene, α-pinene, β-pinene, and δ-3-carene. The present invention also provides a resin produced by this process. For example, a resin produced by this process may be characterized by one or more of: a softening point of 115-150° C., an acid number of 10-50, a Mw of 550-1400, a Mn of 405-750, and a neat Gardner color of 6-12.

In another aspect of the present invention, the process for producing a resin comprises reacting together rosin and phenolic compound. Preferably the rosin and phenolic compound are reacted together in a rosin:phenolic compound weight ratio of about 70:30 to about 90:10. The present invention also provides a resin produced by this process. For example, a resin produced by this process may be characterized by one or more of: a softening point of 115-150° C., an acid number of 30-85, a Mw of 550-1400, a Mn of 405-750, and a neat Gardner color of 6-12.

In another aspect, the present invention provides an article of manufacture comprising chloroprene and a resin of the present invention. The article of manufacture may further comprise, for example, a metal oxide and hydrocarbon solvent. The present invention also provides a method for preparing a chloroprene cement, where the method comprises combining chloroprene, a metal oxide, hydrocarbon solvent and a resin (either RP or RTP) of the present invention.

These and other aspects of the invention will be evident upon reference to the following detailed description of the invention.

DETAILED DESCRIPTION OF THE INVENTION

In various aspects, the present invention provides rosin-terpene-phenol resin (or "RTP resin"), a process for making RTP resin, contact cements containing the RTP resin, and processes for making and using the contact cements. The present invention also provides rosin-phenol resin (or "RP resin"), a process for making RP resin, contact cements containing the RP resin, and processes for making and using the contact cements. It has been surprisingly found that use of the resins of the present invention in contact cement formulations results in significant enhancement of adhesion properties over the contact cement formulations known heretofore in the art. This enhancement of adhesion finds particular relevance in holding together objects undergoing high levels of shear stress, such as in bonding of canvas running shoe components under conditions of heavy use.

Thus, in one embodiment the present invention provides a process for producing a resin comprising reacting together rosin and at least one of phenol and terpene-phenol resin, in the presence of a Brønsted acid. Usage of phenol in this process produces a rosin-phenol resin product ("RP resin"), while usage of terpene-phenol resin produces a rosin-terpene-phenol resin product ("RTP resin"). Before providing details of how these reactants may be combined and reacted together, a brief description of these reactants will be provided. In this description, and throughout the present specification and claims, the terms "a" and "an" refer to one or more of the referenced term. For example, the term "a phenolic compound" includes both one and several phenolic compounds.

Rosin

Rosin is mainly a mixture of $C_{20}$ tricyclic fused-ring monocarboxylic acids, typified by pimaric and abietic acids, where these individual acids are commonly referred to as "resin acids." Rosin suitable for the use in the present invention can be obtained from many sources, and can have a wide range of purities. For example, wood rosin may be employed in the present invention, where wood rosin is obtained from Pinus stumps after harvesting the stumps, chipping the stumps into small chips, extracting the chips with hexane or higher-boiling paraffin, and distilling the hexane or paraffin to yield wood rosin. Another suitable rosin is tall oil rosin, which is a by-product of the Kraft (i.e., sulfate) pulping process for making paper. In this pulping process, pinewood is digested with alkali and sulfide, producing tall oil soap and crude sulfate turpentine as by-products. Acidification of this soap followed by fractionation of the crude tall oil yields tall oil rosin and fatty acids. Depending on the fractionation conditions, the tall oil rosin used in the present invention may contain variable amounts of fatty acids.

Gum rosin, which is the name given to rosin that is obtained after scoring a pine tree, collecting the exudate sap, and then distilling away the volatile components, may also be employed in this invention. An exemplary gum rosin is (without limitation) Chinese gum rosin. In the present invention, the use of gum rosin as the rosin component typically affords resins with higher softening points than are obtained from other types of rosin. Accordingly, the rosin component of the present invention is preferably gum rosin. The use of gum rosin also tended to provide a higher yield of product.

Rosin may be obtained from many commercial suppliers. For example, standards grades of rosin may be obtained from Arizona Chemical Jacksonville, Fla.) under the UNI-TOL®, ACINTOL® or SYLVAROS® trademarks.

Phenolic Compounds

In addition to rosin, the RP resins of the present invention are prepared from a phenolic compound. Phenolic compounds are compounds that include a hydroxy-substituted phenyl group, i.e., an optionally substituted phenol moiety. The molecular formula of phenol is $C_6H_5OH$. A substituted phenol results when one or more of the hydrogens attached to a carbon is replaced with a different group, i.e., a substituent. Phenolic compounds suitable for use as a component of the resin-forming composition of the invention include, without limitation, phenol, $C_{1-12}$ alkylphenols (i.e., phenol having one or more alkyl substituents, where an alkyl substituent has from 1 to 12 carbons), arylphenols, aralkylphenols, cresols, 1,3,5-xylenols, diphenylolpropane, cumylphenol, bisphenol A, and the like. As used herein, alkyl refers to a hydrocarbon structural domain containing exclusively C—C and C—H single bonds; aryl refers to a hydrocarbon structural domain as an aromatic ring system; while aralkyl refers to a hydrocarbon structural domain containing both aromatic and alkyl moieties. In one aspect, the phenolic compound is phenol, while in another aspect the phenolic compound is a mixture of phenolic compounds that includes phenol. In one aspect, the phenolic compound is $C_{1-12}$ alkylphenol, while in another aspect the phenolic compound is a mixture of phenolic compounds that includes $C_{1-12}$ alkylphenol. In one aspect, the phenolic compound is a small molecular weight compound, e.g., a compound having a molecular weight of less than about 500, or less than about 400, or less than about 300 g/mol. However, in another aspect the phenolic compound is a polymer, e.g., a phenol-formaldehyde resin. Phenol is a preferred phenolic compound. Phenolic compounds may be obtained from known sources such as Aldrich Chemical (Milwaukee, Wis.).

Preferably, in the preparation of the RP resins, the rosin and phenolic compound are reacted together in a rosin:phenolic compound weight ratio of about 70:30 to about 90:10, more preferably of about 75:25 to about 85:15, even more preferably of about 80:20.

Preferably, in the preparation of the RP resin, the rosin and phenolic compound provide the majority of the weight of the reactants used to form the RP resin. Thus, in various optional aspects of the invention the rosin and phenolic compound contribute at least 55%, or at least 60%, or at least 65%, or at least 70%, or at least 75%, or at least 80%, or at least 85%, or at least 90%, or at least 95%, or at least 98%, or 100% of the weight of the carbon-containing reactants used to form the RP resin.

Terpene-Phenol Resin

In the preparation of the RTP resins of the present invention, rosin is reacted with a terpene-phenol resin. The terpene-phenol resins ("TP resins") that may be used for the above-disclosed process may be prepared by acid catalyzed polymerization, in a suitable solvent, of one or more terpenes with one or more phenolic compounds. Exemplary phenolic compounds are described in the preceding section. This chemistry is well known in the art (see, e.g., U.S. Pat. Nos. 5,723,566 and 5,844,063) and TP resins are commercially available from many sources. For example, terpene-phenol resins suitable for use in the above-disclosed process of the present invention, include (without limitation) commercial products designated as SLYVARES®) TP96, TP300, TP2040, TP2040HM, TP2019, TP7042 and TP3523 resins, sold by Arizona Chemical Company (Jacksonville, Fla.).

Exemplary terpenes suitable for use in preparing a TP resin include (without limitation) d-limonene, dipentene, α-pinene, β-pinene, and δ3-carene, where each of these terpenes is available from various commercial suppliers, e.g., Aldrich Chemical (Milwaukee, Wis.), Arizona Chemical Company, Jacksonville, Fla. (under trade names such as SYLVAPINE®) A terpene, SYLVAPINE® B terpene, SYLVAPINE® 405 terpene, SYLVAPINE® 402, etc.), Bush Boake & Allen/International Flavors and Fragrances, Jacksonville, Fla. (under trade names such as UNITENE®) LP terpene), and Millennium Specialty Chemicals, Jacksonville, Fla. (under trade names such as MILLENNIUM® 2B13 terpene). Limonene may be obtained as a byproduct of the citrus industry, while dipentene may be obtained by pyrolysis or catalytic cracking of α-pinene. β-Pinene monomer is commonly obtained by distillation of crude sulfate turpentine, which is a by-product of the paper industry. Resin-grade β-pinene is generally about 80% by weight β-pinene and about 20% by weight α-pinene. More pure grades of β-pinene, such as the so-called aroma-chemical grade thereof, which is greater than 90% by weight β-pinene, may also be used in preparing the terpene resins. Pure terpenes, and mixtures of terpenes, may be used to prepare the TP resin.

Lewis acids may be used to facilitate the preparation of TP resins, where suitable Lewis acids include, but are not limited to, boron trifluoride and derivatives or complexes thereof, and strong protic acids such as hydrofluoric and sulfuric acid. While the TP resins will be prepared from terpene and phenolic compound, other co-reactants may be utilized to prepare a TP resin. For example, non-terpene olefins and dienes may be utilized as a co-reactant, where suitable non-terpene olefins and dienes include, without limitation, isobutylene, diisobutylene, 1-alkenes (e.g., 1-octadecene), vinylcyclohexene, piperylene and dicyclopentadiene streams obtained from steam cracking of petroleum distillates, and vinylaromatics such as styrene, indene, methylstyrenes, and alkylaromatic styrenes.

In optional aspects the TP resin used in the process of making the resin of the present invention has a softening point in the range of 95-150° C., or 95-140° C., or 95-130° C., or 95-120° C., or 95-110° C., or 105-150° C., or 105-140° C., or 105-130° C., or 105-120° C., or 115-150° C., or 115-140° C., or 115-130° C., or 125-150° C., or 125-140° C., or 135-150° C., or 140-150° C. The softening point of the TP resin used in the process of making the resin of the present invention is preferably in the range of about 115-150° C., more preferably in the range of about 125-150° C.

Preferably, in the preparation of the RTP resins of the present invention, the rosin and TP resin are reacted together in a rosin:TP resin weight ratio of about 40:60 to about 60:40, more preferably of about 45:55 to about 55:45, even more preferably of about 50:50.

Preferably, in the preparation of the RTP resin, the rosin and TP resin provide the majority of the weight of the reactants used to form the RTP resin, while in various optional aspects the rosin and TP resin contribute at least 55%, or at least 60%, or at least 65%, or at least 70%, or at least 75%, or at least 80%, or at least 85%, or at least 90%, or at least 95%, or at least 98%, or 100% of the weight of the carbon-containing reactants used to form the RTP resin.

Brønsted Acid

The resin and manufacturing process of the present invention utilizes rosin and a co-reactant (either phenolic compound or terpene-phenolic resin) and reacts these materials together in the presence of a Brønsted acid. As used herein, the term "Brønsted acid" has its usual meaning in the art, and refers to a reagent that has the ability to donate protons to a reaction or another reagent. Brønsted acids are well known, where exemplary Brønsted acids include, without limitation, hydrochloric acid, nitric acid, sulfuric acid, sulfonic acids, phosphoric acid, phosphonic acids, acetic acid, and benzoic acid.

Preferred Brønsted acids for use in the present invention are sulfuric and sulfonic acids. Sulfonic acids are compounds that contain a moiety of molecular formula: —S(=O)$_2$(OH). Examples of sulfuric and sulfonic acids include (without limitation) sulfuric acid; optionally-substituted aliphatic sulfonic acids such as methanesulfonic acid, ethanesulfonic acid, propanesulfonic acid, butanesulfonic acid, trifluoromethanesulfonic acid, and 4-decene-3-sulfonic acid; and optionally-substituted aromatic sulfonic acids such as dodecyl benzenesulfonic acid, tridecyl benzenesulfonic acid, cumenesulfonic acid, xylenesulfonic acid, and para-toluenesulfonic acid. In a preferred aspect, the Brønsted acid for use in the present invention is para-toluenesulfonic acid (PTSA).

Reaction Conditions

The process of the present invention includes reacting together rosin and a co-reactant. As used herein, the term "reacting" or "reacting together" means that each of the listed reactants is added to a reaction vessel under reaction conditions such that each reactant reacts with either a) another reactant, or b) a reaction product formed from two or more reactants. Thus, in preparing a RP resin, both rosin and phenolic compound are placed in a reaction vessel. In preparing a RTP resin, both rosin and the terpene-phenolic compound are placed in a reaction vessel. In a preferred embodiment, these are the only carbon-containing reactants used to form the RP or RTP resins, however, in optional embodiments, one or more additional carbon-containing reactants may be utilized to prepare the RP or RTP resin.

The duration and temperature(s) of the reaction are preferably selected in order to prepare a resin, where a resin has a higher molecular weight than any of the resin-forming reactants. The resin preferably has properties as discussed below. In order for an RP-forming or RTP-forming reaction to occur, combinations of the reactants must be exposed to an elevated temperature, e.g., temperature(s) in the range of about 50-300° C., preferably about 80-300° C. At these elevated temperature, the reactants undergo covalent bond-forming reactions with other reactants, so that a resinous material, i.e., a relatively high molecular weight material, is formed. In particular, esterification is observed to occur, where esterification results when carboxylic acid groups (from rosin) react with hydroxyl groups (from phenolic compound or terpene phenol resin).

For example, each of the reactants may be combined in a single reaction vessel, and the combination taken to elevated temperature(s) so that the reactants react with one another to form a resin of the present invention. This approach may be termed a "one-pot" reaction process.

Alternatively, two or more (but less than all) reactants may be combined in a single reaction vessel, and this combination taken to elevated temperature(s) so that the reactants react with one another to form an intermediate reaction product. The other reactants are reacted with the intermediate reaction product (in either the same or a different reaction vessel). Thus, the invention provides that the reactants may be reacted with one another in any order, at one or more elevated temperatures, to obtain a resin of the present invention. It should be recognized however that the same reactants (in terms of quantity and identity) may form resins with different physical and performance properties, depending on the precise manner in which the reactants are reacted together.

The reaction temperature(s) is selected with the following points in mind. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur.

In the preparation of the RP and RTP resins of the present invention, the reaction may be carried out in a solvent. Preferably the solvent is a nonpolar solvent, since the reaction components, being reasonably nonpolar in nature, tend to solubilize more readily in a nonpolar solvent than in a polar solvent. More preferably the solvent is nonpolar with a high boiling point, since the esterification process of the present invention produces water as a by-product. By using a solvent with a boiling point greater than 100° C., water can be boiled out of the reaction mixture to prevent the reaction from reversing direction, without greatly affecting the volume of the solvent. Examples of such solvents include (without limitation) xylene and toluene.

Resin Properties

In the present invention, the extent of esterification achieved in the resin preparation may be regulated by the length of time given the reaction process. More time allowed for esterification will generally lower the acid number of the resin product, as more rosin acid groups are converted to ester groups. As used herein, acid number is equal to the amount of KOH base (in milligrams) needed to neutralize one gram of resin product. Preferably, the RTP resins of the present invention have an acid number of about 10-85 or 10-80 or 10-75 or 10-70 or 10-65 or 10-60 or 10-55; more preferably the RTP resins of the present invention have an acid number of about 10-50. Preferably, the RP resins of the present invention have an acid number of about 10-85 or 15-85 or 20-85 or 25-85; more preferably the RP resins of the present invention have an acid number of about 30-85. Samples may be taken periodically from the reaction mixture and analyzed for acid number, in order to monitor the extent of the reaction.

The duration of reaction time will also impact the molecular weight of the resulting product. Typically, the molecular weight of the resin product will increase as more time is provided for the formation of covalent bonds in the reaction product. In a preferred aspect, the resins produced by the process of the present invention have a molecular weight (Mw) in the range of 550-1400, and Mn in the range of 405-750. These molecular weight values are obtained using gel permeation chromatography, in a suitable solvent such as tetrahydrofuran, using polystyrene standards to calibrate the retention times to molecular weight values.

The extent of esterification of the resin products may be monitored by the following method. First, test samples of the reaction mixture (about 6-7 g) are drawn periodically from the reaction vessel, and quenched with an aqueous solution of sodium carbonate (about 4-5% (w/v)). The organic layer of each test sample is collected, heated to about 110° C. for about 20 minutes, and the remaining residue is weighed to determine the percentage of the reaction mixture that is solid material. This residue can then be subjected to an acid number determination using methods known to those of ordinary skill in the art, with the degree of esterification taken to be inversely proportional to the acid number of each sample. Alternatively, or in addition, the sample residue can be analyzed via infrared spectroscopy, comparing the peak intensities at 1744 cm$^{-1}$ (ester C=O) and 1696 cm$^{-1}$ (acid C=O). The degree of esterification is taken to be directly proportional to the peak intensity at 1744 cm$^{-1}$ and inversely proportional to the peak intensity at 1696 cm$^{-1}$.

The color of the resin products of the present invention can be measured according to the Gardner color scale, where a score of zero corresponds to a colorless composition, and a score of fifteen corresponds to a red-brown composition. An accurate determination of the Gardner color of a resin can be obtained with a Spectronic 301 spectrophotometer (Milton Roy, Rochester) set in the absorbance (Abs) mode. The Spectronic 301 is a single beam, visible range spectrophotometer that is microprocessor-controlled. The wavelength range is 325 to 900 nm with an accuracy of ±2 nm and wavelength precision of ±1 nm. The Spectronic 301 has a photometric range of −0.1 to 2.5 Abs units. The Spectronic 301 requires a 30-minute warmup to maintain these ranges accurately and is calibrated annually using Milton Roy Spectronic standards. Wavelength and photometric data are sent to an external compute by a built-in RS232C port. The external computer interprets the data, absorbance at wavelengths 200-700 nm in increments of 10 nm based upon the Gardner colors standards. The data is translated using ASTM standard E308 and provides a printout of both Gardner colors and values. The Gardner values are a digital version of the Gardner colors. For example, a Gardner color of 3− is equivalent to a Gardner value of 2.50 to 2.82; a Gardner color of 3 is equivalent to a Gardner value of 2.83 to 3.17; and a Gardner color of 3+ is equivalent to a Gardner value of 3.17 to 3.49. The software is available from Paul N. Gardner Company Inc. (Pompano Beach, Fla.). In one aspect, the product resins of the present invention exhibit a neat (i.e., solvent-free) Gardner color in the range of 6 to 12.

Adhesive Composition and Articles Made Therefrom In another aspect, the present invention provides an adhesive composition that includes a RP or RTP resin of the present invention. One such adhesive composition is a contact cement. Contact cements are well known in the art (see, e.g., U.S. Pat. Nos. 5,733,958 and 5,897,412) and are available from many commercial sources (see, e.g., Macco Adhesives, Cleveland Ohio 44115 USA; DAP Inc., Baltimore Md. 21224 USA; www.dap.com; and Henkel Consumer Adhesives, Avon Ohio 44011 USA; www.henkelca.com). Contact cements are frequently used in footwear manufacture, however contact cements also find use in any situation where two surfaces must be bonded together.

Contact cements are particularly useful when the article being formed by bonding two or more pieces together will need to be flexible during use, e.g., in shoes, fabrics, wood products, rubber rafts, tires, etc. Accordingly, in one aspect, the present invention provides an article of manufacture, e.g., a shoe, where the article includes a rubber, e.g., a chloroprene rubber, and a resin of the present invention, i.e., a RP or RTP resin.

In one aspect, the adhesive composition and article made therefrom includes a RP or RTP resin in admixture with a rubber, e.g., a natural rubber or a chloroprene rubber, and is a contact cement. Chloroprene rubber, also known as polychloroprene, is a preferred component of the adhesive composition, where DuPont Dow Elastomers L.L.C. (Wilmington, Del., USA; www.dupont-dow.com/neoprene) sells a suitable chloroprene rubber under their NEOPRENE trademark. The contact cement formulation may be in the form of a solid or an aqueous emulsion. In other optional aspects, the composition and article made therefrom may further comprise a metal oxide (such as, for example, magnesium oxide and/or zinc oxide). The composition may also include a hydrocarbon solvent, such as, for example, toluene or xylene.

Thus, the present invention provides a process for preparing an adhesive composition, e.g., a contact cement, comprising combining a polymer, e.g., a rubber such as chloroprene, with a RP or RTP resin, optionally in the presence of one or more metal oxides, and optionally in the presence of one or more insert solvents. The composition is readily prepared by combining the ingredients in a suitable container and then mixing until a homogeneous composition results. The RP or RTP resin of the present invention may be substituted for, or used in addition to, other tackifier resins presently used in contact cements, and particularly rosin-derived tackifier resins.

In one aspect, the contact cement is applied to a surface, e.g., a cloth or rubber surface, and allowed to dry. The dried contact cement is then contacted with another surface that has been similarly treated, and the two surfaces are held together under elevated temperature, e.g., about 100-150° C. Upon cooling, a laminated product is produced, where the two surfaces are adhesively coupled together via the contact cement. Alternatively, after the contact cement has been applied to a surface, but before the contact cement has dried, a second surface is applied to the contact cement-coated surface, and upon drying of the contact cement, the two surfaces are adhesively bonded together.

Thus, the present invention provides a method of bonding two surfaces together, where the method includes coating at least one of the surfaces with a RP- or RTP-containing adhesive composition, and then holding the two surfaces together under adhesion-promoting conditions. A surface may be coated by spraying, brushing or otherwise applying the adhesive onto the surface. The adhesive-promoting conditions are a suitable combination of time and temperature.

The following examples are provided for the purpose of illustrating the present invention, and are not a limitation thereon. Reagents were reagent grade or better as obtained from sources such as Aldrich Chemical (Milwaukee, Wis.). SYLVARES™ TP7042 terpene-phenol resin was from Arizona Chemical (Jacksonville, Fla.). TAMANOL™ 803L terpene phenolic resin was obtained from Arakawa Chemical (USA) Inc. (Chicago, Ill.; www.arakawa-usa.com). Comparative examples are denoted by a letter "C" following the example number.

EXAMPLE 1

SYNTHESIS OF RTP RESIN

A solution of 100 g Chinese gum rosin in 175 g of xylene was charged to a one-liter Morton flask equipped with an agitator, a Dean-Stark trap filled with xylene and attached to a condenser, and a thermocouple probe assembly with an inlet for nitrogen. The flask was then further charged with a solution of 100 g SYLVARES™ TP7042 terpene-phenol resin in 175 g of xylene. Following addition of 12 g para-toluenesulfonic acid to the rosin-TP mixture, the mixture was heated over an electric heating mantle and brought to reflux. As the reaction was allowed to proceed, water formed by the reaction (esterification by product) was collected at the bottom of the Dean-Stark trap. The reaction mixture was allowed to reflux for a total of about 7 hours, or until the desired level of esterification was reached, as determined by one of the esterification monitoring procedures described hereinbefore.

When the desired level of esterification was reached, the reaction mixture was cooled to less than about 90° C., and the reaction was quenched by the addition of a sodium carbonate solution (about 7.2 g in 150 mL water). The water was then removed from the reaction flask as follows: after heating the quenched mixture to about 75-80° C. and agitating the reaction flask for about 10 minutes, the mixture was allowed to separate into layers and the aqueous layer was drawn off. The reaction mixture was then treated with an additional 150 mL of water, and the water removal procedure was repeated.

The remaining reaction mixture was then charged to a tared 4-neck round bottom flask equipped with an agitator, a condenser via a 3-way take-off adapter, a thermocouple assembly, and a sparge tube. The reaction mixture was heated to about 245° C. with agitation under constant nitrogen sparge (at a rate of about 2000 mL/min), with the solvent distilling off at about 140-170° C. Samples of the reaction mixture were extracted periodically (in 1-2 mL aliquots) under nitrogen purge, and analyzed for softening point. The reaction was allowed to proceed under nitrogen sparge until the desired softening point was reached. Then, the reaction product was cooled and discharged, to afford an RTP tackifier resin with a softening point of 149.7° C. and a Gardner color of 8.9 (neat).

EXAMPLE 2

SYNTHESIS OF RP RESIN

A solution of 160 g Chinese gum rosin in 275 g of xylene was charged to a one-liter Morton flask equipped with an agitator, a Dean-Stark trap filled with xylene and attached to a condenser, and a thermocouple probe assembly with an inlet for nitrogen. The flask was then further charged with a solution of 40 g phenol in 100 g of xylene. Following addition of 9.6 g para-toluenesulfonic acid to the rosin-phenol mixture, the mixture was heated over an electric heating mantle and brought to reflux. As the reaction was allowed to proceed, water formed by the reaction (esterification by-product) was collected at the bottom of the Dean-Stark trap. The reaction mixture was allowed to reflux for a total of about 7 hours, or until the desired level of esterification was reached, as determined by one of the esterification monitoring procedures described hereinbefore.

When the desired level of esterification was reached, the reaction mixture was cooled to less than about 90° C., and the reaction was quenched by the addition of a sodium carbonate solution (about 5.8 g in 150 mL water). The water was then removed from the reaction flask as follows: after heating the quenched mixture to about 75-80° C. and agitating the reaction flask for about 10 minutes, the mixture was allowed to separate into layers and the aqueous layer was drawn off. The reaction mixture was then treated with an additional 150 mL of water, and the water removal procedure was repeated.

The remaining reaction mixture was then charged to a tared 4-neck round bottom flask equipped with an agitator, a condenser via a 3-way take-off adapter, a thermocouple assembly, and a sparge tube. The reaction mixture was heated to about 245° C. with agitation under constant nitrogen sparge (at a rate of about 2000 mL/min), with the solvent distilling off at about 140-170° C. Samples of the reaction mixture were extracted periodically (in 1-2 mL aliquots) under nitrogen purge, and analyzed for softening point. The reaction was allowed to proceed under nitrogen sparge until the desired softening point was reached. Then, the reaction product was cooled and discharged, to afford an RP tackifier resin with a softening point of 139.6° C. and a Gardner color of 9.3 (neat).

EXAMPLES 3-4, 5C-8C, 9, 10 AND 11C

ADHESIVE FORMULATION AND TESTING

Contact cement compositions were prepared according to the weight percentages indicated in Table 1. A reaction flask was charged with chloroprene polymer, zinc oxide, antioxidant (IRGANOX™ 1076 antioxidant from Ciba Specialty Chemicals, Tarrytown N.Y. 10591 USA; www.cibasic.com was used, however other antioxidants could alternatively be used), four-ninths of the indicated amount of magnesium oxide, and toluene (about six times the weight of polymer). The reaction mixture was then agitated until all polymer was dissolved and the inorganic components were dispersed. A separate reaction flask was charged with tackifier resin, the remaining magnesium oxide, toluene (about twice the weight of tackifier resin), and water (about one-ninth the total amount of magnesium oxide), and mixed until the tackifier resin was dissolved and the inorganic components were dispersed. The contents of the two flasks were then combined and mixed until homogenous, affording a contact cement composition.

Contact cement compositions were then tested for adhesive strength. Prior to any coating the contact cements were agitated in case any settling had occurred. Then, the contact cement composition was applied to cotton canvas substrate using a hand Acculab Drawdown Machine with a #20 wire wrapped rod. Each contact cement sample was coated onto cotton canvas and allowed to dry at ambient temperature. This process was repeated until a coating thickness was obtained such that the weave of the fabric was no longer visible on the surface of the adhesive film.

The coated sample substrates were allowed to cure for a week at ambient temperature, before being heat-sealed to another sample substrate coated with the same adhesive. Heat sealing was done with a Carver Press (Carver, Inc., Wabash, Ind., USA; www.carverpress.com) at 125° C. and 89 psi, for five minutes, and samples were then allowed to rest at ambient temperature for five days. Then, after being cut into one-inch wide strips, an Instron Model 1137 test instrument (Instron Corporation, Canton Mass.; www.instron.com) was used to separate the sample substrates from each other, in a t-peel format at a rate of 12 inches/min. The average force required to separate six inches of the strips (i.e., peel) is indicated in Table 1.

For comparison purposes, two resins were selected. One was a commercial product, TAMANOL™ 803L tackifier, which is commonly used in contact cement formulations for footwear manufacture. The other was a resin prepared using $BF_3$ catalysis in lieu of Brønsted acid catalysis. The data of Table 1 evidence the superior performance properties of RP and RTP resins of the present invention. Thus, in various optional aspects of the invention, the RP or RTP resin provides a peel value (lb/in, measured as described herein) of greater than 20, or greater than 21, or greater than 22, or greater than 23, or greater than 24, or greater than 25, or greater than 26, or greater than 27, or greater than 28, or greater than 29, or greater than 30, or greater than 31, or greater than 32, or greater than 33, or greater than 34, or greater than 35, or greater than 36, or greater than 37, or greater than 38, or greater than 39, or greater than 40, or greater than 41, or greater than 42, or greater than 43, or greater than 44.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

TABLE 1

Contact Cement Formulations and Properties

| Component | Ex. 3 | Ex. 4 | Ex. 5C | Ex. 6C | Ex. 7C | Ex. 8C | Ex. 9 | Ex. 10 | Ex. 11C |
|---|---|---|---|---|---|---|---|---|---|
| | | | | | Weight Percent | | | | |
| Chloroprene polymer | 60.2 | 60.2 | 60.2 | 60.2 | 60.2 | 60.2 | 72.2 | 72.2 | 72.2 |
| Tackifier resin | 30.1 | 30.1 | 30.1 | 30.1 | 30.1 | 30.1 | 18.1 | 18.1 | 18.1 |
| MgO | 5.5 | 5.5 | 5.5 | 5.5 | 5.5 | 5.5 | 5.5 | 5.5 | 5.5 |
| ZnO | 3.0 | 3.0 | 3.0 | 3.0 | 3.0 | 3.0 | 3.0 | 3.0 | 3.0 |
| IRGANOX ™ 1076 antioxidant | 1.2 | 1.2 | 1.2 | 1.2 | 1.2 | 1.2 | 1.2 | 1.2 | 1.2 |
| Tackifier type | RP resin of Ex. 2 | RTP resin of Ex. 1 | $BF_3$-catalyzed | $BF_3$-catalyzed | $BF_3$-catalyzed | TAMANOL ™ 803L | RP resin of Ex. 2 | RTP resin of Ex. 1 | TAMANOL ™ 803L |
| Rosin:Phenol weight ratio | 4:1 | — | — | — | — | — | 4:1 | — | — |
| Rosin:TP weight ratio | — | 1:1 | — | — | — | — | — | 1:1 | — |
| Rosin/Terpene/Phenol w/w Distribution | — | — | 1:1:0.5 | 2:1:0.75 | 1:2:0.75 | — | — | — | — |
| % phenol in $BF_3$-catalyzed samples | — | — | 20 | 20 | 20 | — | — | — | — |
| Peel (lb/in) | 25.8 | 32.3 | 4.0 | 19.0 | 11.5 | 20.5 | 24.7 | 44.2 | 25.2 |

The invention claimed is:

1. A process for producing a resin, comprising reacting rosin with a phenolic compound in the presence of a Bronsted acid under esterification reaction conditions to produce a rosin-phenol ester, wherein said rosin and said phenolic compound are reacted together in a rosin:phenolic compound weight ratio of from 70:30 to 90:10 wherein said esterification reaction conditions comprise the presence of a solvent.

2. The process according to claim 1, wherein the rosin is at least one member selected from the group consisting of wood rosin, tall oil rosin, and gum rosin.

3. The process according to claim 1, wherein rosin is reacted with phenol.

4. The process according to claim 1, wherein rosin is reacted with alkylphenol.

5. The process according to claim 1, wherein rosin is reacted with a $C_1$-$C_{12}$ alkylphenol.

6. The process according to claim 1, wherein the Bronsted acid is sulfonic acid, sulfuric acid, or mixture thereof.

7. The process according to claim 1, wherein the Bronsted acid is paratoluene sulfonic acid, sulfonic acid, sulfuric acid, or mixtures thereof.

8. The process according to claim 1, wherein the rosin is tall oil rosin.

9. The process according to claim 1, wherein the rosin is gum rosin.

10. The process according to claim 9, wherein the rosin is Chinese gum rosin.

11. A resin produced by the process according to claim 1.

12. The resin according to claim 11, wherein the resin has an acid number of from 30 to 85.

13. The resin according to claim 12, wherein the resin has a Mw of from 550 to 1400.

14. The resin according to claim 13, wherein the resin has a Mn of from 405 to 750.

15. The resin according to claim 14, wherein the resin has a neat Gardner color of from 6 to 12.

16. The resin of claim 11 wherein the resin has a Mw of from 550 to 1400.

17. The resin of claim 11 wherein the resin has a Mn of from 405 to 750.

18. The resin of claim 11 wherein the resin has a neat Gardner color of from 6 to 12.

19. The resin of claim 11 wherein said resin has a softening point of from 115 to 150° C.

* * * * *